United States Patent
Chinnaiyan

(10) Patent No.: US 10,344,995 B2
(45) Date of Patent: Jul. 9, 2019

(54) HVAC SYSTEM CONTROLLER CONFIGURATION

(71) Applicant: TRANE INTERNATIONAL INC., Piscataway, NJ (US)

(72) Inventor: Senthil Chinnaiyan, Chennai (IN)

(73) Assignee: TRANE INTERNATIONAL INC., Davidson, NC (US)

( * ) Notice: Subject to any disclaimer, the term of this patent is extended or adjusted under 35 U.S.C. 154(b) by 958 days.

(21) Appl. No.: 14/533,567

(22) Filed: Nov. 5, 2014

(65) Prior Publication Data

US 2015/0127173 A1    May 7, 2015

(30) Foreign Application Priority Data

Nov. 5, 2013 (IN) .......................... 3267/DEL/2013

(51) Int. Cl.
| | |
|---|---|
| *F24F 11/00* | (2018.01) |
| *F24F 11/30* | (2018.01) |
| *F24F 11/52* | (2018.01) |
| *F24F 11/64* | (2018.01) |
| *G05B 15/02* | (2006.01) |
| *G05D 23/19* | (2006.01) |
| *G06F 3/048* | (2013.01) |
| *G06F 3/0481* | (2013.01) |
| *G06F 3/0484* | (2013.01) |

(52) U.S. Cl.
CPC .......... *F24F 11/30* (2018.01); *F24F 11/0001* (2013.01); *G05D 23/19* (2013.01); *F24F 11/52* (2018.01); *F24F 11/64* (2018.01); *G05B 15/02* (2013.01); *G05B 2219/2614* (2013.01); *G05B 2219/2642* (2013.01); *G06F 3/048* (2013.01); *G06F 3/0481* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 8,078,326 | B2 | 12/2011 | Harrod et al. |
| 8,368,337 | B2 | 2/2013 | Bonilla et al. |
| 8,544,285 | B2 | 10/2013 | Stefanski et al. |
| 8,621,377 | B2 | 12/2013 | D'Souza et al. |
| 2002/0152298 | A1 | 10/2002 | Kikta et al. |
| 2008/0222565 | A1 | 9/2008 | Taylor et al. |
| 2010/0298985 | A1 | 11/2010 | Hess et al. |
| 2012/0083934 | A1 | 4/2012 | Jesudason et al. |

(Continued)

*Primary Examiner* — Qing Yuan Wu
(74) *Attorney, Agent, or Firm* — Hamre, Schumann, Mueller & Larson, P.C.

(57) ABSTRACT

A method for configuring a heating, ventilation, and air conditioning (HVAC) system controller and an HVAC system controller are disclosed. The method includes displaying an installation profile icon on a user interface of the HVAC system controller, the installation profile icon representing an installation profile that includes one or more settings for one or more parameters. The HVAC system controller receives an input on the user interface of the HVAC system controller based on a selection of the installation profile icon. The method further includes setting the one or more parameters in a memory of the HVAC system controller based on the one or more settings for the one or more parameters in the installation profile in response to receiving the input.

14 Claims, 11 Drawing Sheets

(56) References Cited

U.S. PATENT DOCUMENTS

| | | |
|---|---|---|
| 2012/0158203 A1 | 6/2012 | Feldstein |
| 2012/0191258 A1* | 7/2012 | Amundson ........ G05B 19/0426 700/278 |
| 2013/0204440 A1 | 8/2013 | Fadell et al. |
| 2013/0204442 A1 | 8/2013 | Modi et al. |
| 2013/0345883 A1 | 12/2013 | Sloo et al. |
| 2014/0058567 A1* | 2/2014 | Matsuoka .......... G05D 23/1917 700/276 |
| 2014/0067132 A1 | 3/2014 | Macek et al. |

* cited by examiner

HVAC SYSTEM CONTROLLER CONFIGURATION

FIELD

Embodiments of this disclosure relate generally to a heating, ventilation, and air conditioning (HVAC) system. More specifically, the embodiments relate to a configurable HVAC system controller.

BACKGROUND

A heating, ventilation, and air conditioning (HVAC) system generally includes equipment configured to control one or more environmental conditions such as, but not limited to, temperature, humidity, and air quality. The function and control of the HVAC equipment is typically adjusted by a thermostat, which can be connected to an HVAC system controller. A thermostat can alternatively be a part of the HVAC system controller. An HVAC system controller may be configurable in order to be included in HVAC systems including varying types of HVAC equipment and configurations.

SUMMARY

Embodiments of this disclosure relate generally to a heating, ventilation, and air conditioning (HVAC) system. More specifically, the embodiments relate to a configurable HVAC system controller.

Embodiments of this disclosure include a configurable HVAC system controller. The configurable HVAC system controller includes one or more installation profiles selectable during a configuration process. The one or more installation profiles are selectable to complete the configuration process with preselected settings for one or more parameters. As a result, a user (such as, but not limited to, an HVAC technician, a purchaser of an HVAC system controller, or the like) can select an installation profile and complete the configuration process without going through and individually configuring the settings for the one or more parameters. In an embodiment, this can reduce the configuration time. In another embodiment, this configuration process can reduce configuration time and complexity.

In an embodiment, an HVAC system controller is configured to enable saving a configured installation profile. The configured installation profile can be sent, via a network, to a storage medium. In an embodiment, the HVAC system controller may have to be configured with authentication information in order to be able to communicate with the storage medium. In another embodiment, the HVAC system controller can include a device identifier that is used to authenticate the HVAC system controller.

In another embodiment, an HVAC system controller includes a Web Installation mode. The Web Installation Mode can include search functionality for a user interface of the HVAC system controller in order to locate previously saved installation profiles. The HVAC system controller can be configured according to the settings in the saved installation profile. The Web Installation Mode can be used to configure a plurality of HVAC system controllers in a single HVAC system. In another embodiment, the Web Installation Mode can be used to configure a plurality of HVAC system controllers that are in a plurality of HVAC systems.

A method for configuring a heating, ventilation, and air conditioning (HVAC) system controller is disclosed. The method includes displaying an installation profile icon on a user interface of the HVAC system controller, the installation profile icon representing an installation profile that includes one or more settings for one or more parameters. The HVAC system controller receives an input on the user interface of the HVAC system controller based on a selection of the installation profile icon. The method further includes setting the parameter in a memory of the HVAC system controller based on the setting for the parameter in the installation profile in response to receiving the input.

A heating, ventilation, and air conditioning (HVAC) system controller is disclosed. The HVAC system controller includes a processor in communication with a memory and a user interface. The processor of the HVAC system controller is configured to display an installation profile icon on a user interface of the HVAC system controller, the installation profile icon representing an installation profile, wherein the installation profile includes one or more settings for one or more parameters. The processor is further configured to receive an input on the user interface of the HVAC system controller based on a selection of the installation profile icon. The processor of the HVAC system controller is configured to set the one or more parameters in a memory of the HVAC system controller based on the one or more settings for the one or more parameters in the installation profile in response to receiving the input.

BRIEF DESCRIPTION OF THE DRAWINGS

References are made to the accompanying drawings that form a part of this disclosure and which illustrate the embodiments in which the systems and methods described in this Specification can be practiced.

Like reference numbers represent like parts throughout.

DETAILED DESCRIPTION

Figure 1:
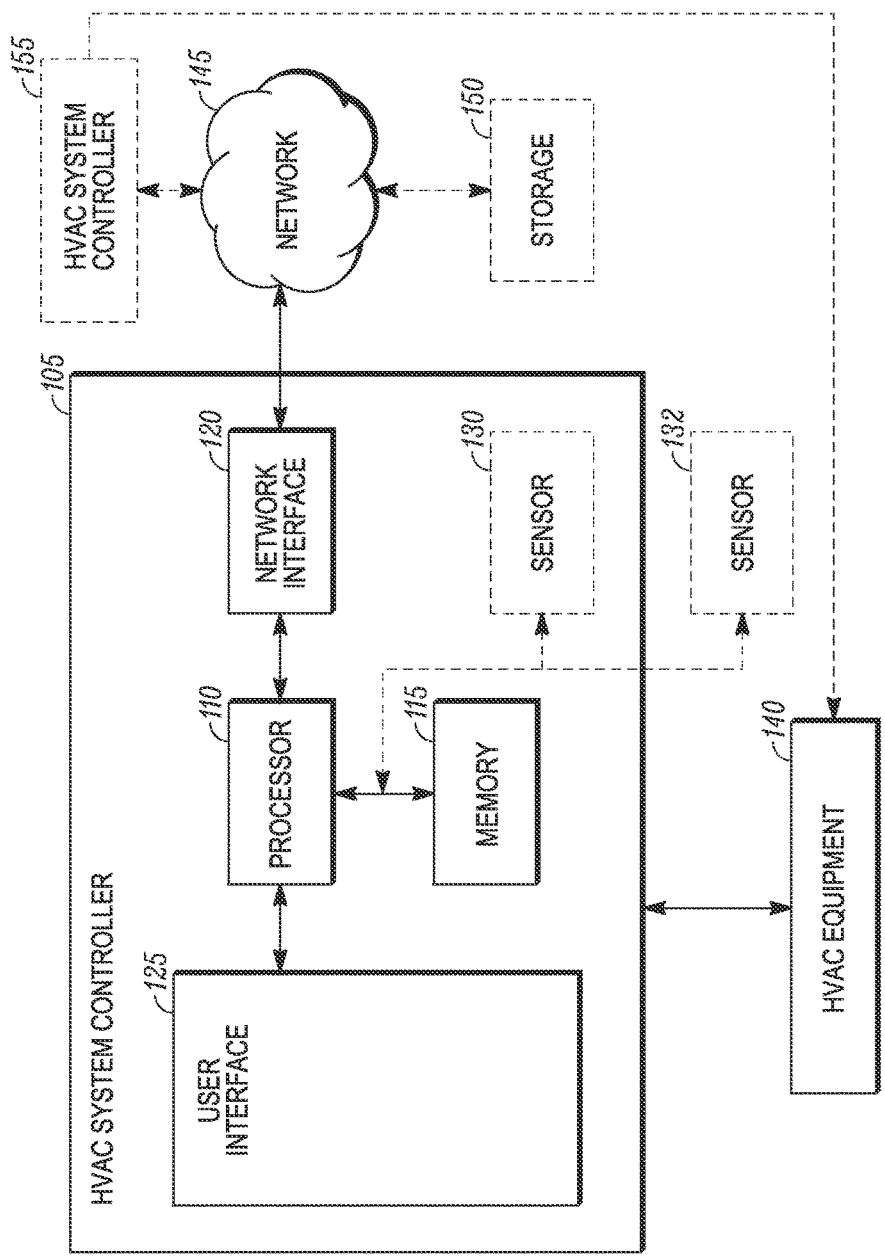
FIG. 1 illustrates a schematic diagram of a heating, ventilation, and air conditioning (HVAC) system controller connected to HVAC equipment and a network, according to an embodiment.

Embodiments of this disclosure relate generally to a heating, ventilation, and air conditioning (HVAC) system. More specifically, the embodiments relate to a configurable HVAC system controller.

A heating, ventilation, and air conditioning (HVAC) system generally includes an HVAC system controller and equipment configured to control one or more environmental conditions such as, but not limited to, temperature, humidity, and air quality. The HVAC system controller can be configured to control one or more operations of the HVAC equipment. For example, the HVAC system controller can be a configurable thermostat (or include a configurable thermostat) and be configured to control the HVAC equipment to maintain a desired temperature in a space conditioned ("conditioned space") by the HVAC equipment. The HVAC system controller can be configured to control an environmental condition other than temperature, such as, but not limited to, monitoring air quality, humidity, and the like, in the conditioned space. In an embodiment, the HVAC system controller can be further configured to monitor additional aspects of the HVAC system.

Configuring an HVAC system controller can be a complex, time-consuming task. Configuring an HVAC system controller can alternatively be referred to as installing an HVAC system controller. An HVAC system can include a variety of different equipment, and the operation of the HVAC system controller may need to be configured with settings based on the particular type of HVAC equipment the HVAC system controller is controlling. For example, the HVAC system controller may include a parameter identifying a type of indoor HVAC equipment, and the corresponding setting can include options such as, but not limited to, gas/oil, electric, or hydronic. The HVAC system controller may include more than one hundred such parameters that are set in order for the HVAC system to properly function.

An HVAC system, whether residential or commercial, includes a variety of equipment. The HVAC system can include equipment such as, but not limited to, an outdoor unit (such as, but not limited to, an air conditioning unit), an indoor unit (such as, but not limited to, a furnace), and other equipment (such as, but not limited to, a humidifier, a dehumidifier, and the like). Each piece of equipment within the HVAC system can include components such as, but not limited to, a compressor, a blower, a fan, a sensor, a filter, and the like. The various equipment and components can include more than one operating mode, such as, but not limited to, multiple stage cooling, multiple stage heating, and the like. The equipment and its components within the HVAC system can operate according to various scheduling conditions, such as, but not limited to, a number of heating cycles per hour, a number of cooling cycles per hour, a fan or blower delay, and the like. The equipment and its components can further include additional operating conditions such as, but not limited to, a ventilation minimum or maximum outdoor temperature, a compressor lockout, whether to enable dehumidification, and the like.

Embodiments of this disclosure include a configurable HVAC system controller. The configurable HVAC system controller includes one or more installation profiles selectable during a configuration process. The one or more installation profiles are selectable to complete the configuration process with preselected settings. As a result, a user such as, but not limited to, an HVAC technician, a purchaser of an HVAC system controller, and the like, can select an installation profile and complete the configuration process without going through and setting the numerous parameters. In an embodiment, this can reduce the configuration time. In another embodiment, this configuration process can reduce configuration time and complexity.

A "parameter" in the HVAC system controller includes, for example, a type of HVAC equipment, an operating mode of the HVAC equipment, an operational condition of the HVAC equipment, and the like. Each parameter includes a corresponding setting. A list of exemplary parameters includes, for example, an outdoor unit type, a number of cooling stages, a compressor type, an indoor unit type, a number of heating stages, an indoor blower type, and the like. A parameter can alternatively be referred to as, for example, a configurable parameter, an option, an installer setting, and the like.

An "installation profile" includes, for example, one or more parameters where the one or more parameters have one or more settings. The one or more parameters and the one or more settings in the installation profile can be preselected. Accordingly, when a user selects an installation profile, the one or more parameters in the HVAC system controller are configured with the one or more preselected settings from the installation profile. For example, in an embodiment, the installation profile can include the parameter "type of furnace" with the corresponding setting preselected as "gas." In an embodiment, a user can override the preselected settings after configuring based on the installation profile.

A "Selectable Profile Mode" includes, for example, a mode of configuring one or more parameters with one or more preselected settings in an HVAC system controller. The Selectable Profile Mode can also be referred to as a "One Touch Installation Mode" throughout this Specification. The One Touch Installation Mode includes, for example, providing at least one installation profile having one or more parameters and one or more preselected settings for the parameters when an installation profile is selected. In an embodiment, this can reduce a configuration time since a user does not need to individually configure the setting for each parameter. Accordingly, in an embodiment including a Selectable Profile Mode or a One Touch Installation Mode, upon selecting the installation profile, the HVAC system controller configures the parameters according to the preselected settings in the installation profile by selecting a single option. In another embodiment, the selection of the installation profile may include one or more intermediate screens such as, but not limited to, a confirmation screen.

FIG. 1 illustrates a schematic diagram of a heating, ventilation, and air conditioning (HVAC) system controller 105 connected to HVAC equipment 140 and a network 145. The HVAC system controller 105 can be configured to control one or more operations of the HVAC equipment 140. For example, the HVAC system controller 105 can be a configurable thermostat (or include a configurable thermostat) and the HVAC equipment 140 can be a furnace, with the configurable thermostat configured to control the furnace to, for example, maintain a desired temperature in a conditioned space. The HVAC equipment 140 can represent any of a variety of equipment configured for use in an HVAC system. For example, the HVAC equipment 140 can represent a furnace, an air conditioning unit, and the like.

The HVAC system controller 105 includes a processor 110 in communication with a memory 115, a network interface 120, and a user interface 125. The HVAC system controller 105 can be configured to control an environmental condition other than temperature, such as, but not limited to, monitoring air quality, humidity, and the like, in the conditioned space. In an embodiment, the HVAC system controller 105 can be programmed to monitor additional aspects of the HVAC system.

The processor 110 is configured to retrieve and execute programming instructions stored in the memory 115. For example, the processor 110 can retrieve and execute programming instructions in order to configure the HVAC system controller 105 for particular HVAC equipment 140. The processor 110 can include any suitable processor, such as, but not limited to, a single processor, a single processor having multiple processing cores, multiple processors, and the like.

The memory 115 is in communication with the processor 110. The memory 115 is generally included to be representative of a random access memory such as, but not limited to, a dynamic random access memory, a static random access memory, a Flash memory, and the like. The memory 115 stores instructions for an operating system that is executed by the processor 110. The memory 115 can also store an instruction for a computer program that is executed by the processor 110. The computer program includes instructions such as, but not limited to, a one-touch installation procedure, a save configuration procedure, and a web installation procedure. The memory 115 stores a plurality of parameters and corresponding settings for the plurality of parameters that are, for example, based on the HVAC equipment 140. In an embodiment, the plurality of settings stored in the memory 115 includes, for example, a schedule according to which the HVAC equipment heats or cools a conditioned space.

The network interface 120 is configured to connect the HVAC system controller 105 to a network 145. The network 145 can be, for example, the Internet, a cellular network, a wireless network (WiFi), and the like. The network interface 120 is in communication with the network 145 via a wired connection, according to an embodiment. In another embodiment, the network interface 120 is in communication with the network 145 via a wireless communication, such as, but not limited to, WiFi, Bluetooth, ZigBee, Z-Wave, other radio frequency (RF) communication, and the like.

The user interface 125 is a combination display and a human-computer interface device. The user interface 125 displays an image as instructed by the processor 110. In an embodiment, the user interface 125 can be a touchscreen. In another embodiment, the user interface 125 can include a combination of user inputs such as, but not limited to, buttons and a display. In such an embodiment, the display can be a touchscreen or a display-only screen. The user interface 125 can be configured to detect a user input via touch or contact by a human finger or a device such as, but not limited to, a stylus device. The user interface 125 sends a signal indicative of the detected user input to the processor 110.

In an embodiment, the sensor 130 is a temperature sensor. For example, the HVAC system controller 105 can represent a configurable thermostat including the temperature sensor 130. The sensor 130 is optional and may not be a part of the HVAC system controller 105, but can be in communication with the HVAC system controller 105 and disposed outside the HVAC system controller 105, similar to the optional sensor 132. The optional sensor 132 can include a sensor other than a temperature sensor. For example, if the HVAC system controller 105 is configured to control humidity or air quality, the sensor 132 can respectively represent a humidity sensor or an air quality sensor. In an embodiment, the HVAC system controller 105 can include the sensor 130 and be in communication with the sensor 132. In another embodiment, the HVAC system controller 105 can include either the sensor 130 or the sensor 132 or both sensors 130 and 132.

The storage 150 can include, for example, a hard disk drive, a solid-state drive, a Flash memory storage drive, and the like. The storage 150 is in communication with the HVAC system controller 105 via the network 145. In an embodiment, the storage 150 can include one or more applications, such as, but not limited to, a storage manager that can be configured to send and receive information over the network 145 to the HVAC system controller 105. The storage 150 can represent a single storage medium or a plurality of storage media. In an embodiment, the storage 150 can be part of a cloud storage system and include, for example, virtualized storage.

The HVAC system controller 105 includes a Save Configuration Mode (discussed in additional detail in accordance with FIG. 4 below) and a Web Installation Mode (discussed in additional detail in accordance with FIG. 5 below). In these operating modes, the configuration settings of the HVAC system controller 105 can be saved to the storage 150 for configuring another HVAC system controller 155. The HVAC system controller 155 can be in communication with the HVAC equipment 140 and part of the same HVAC system as the HVAC system controller 105, according to an embodiment. In another embodiment, the HVAC system controller 155 can be connected to HVAC equipment similar to the HVAC equipment 140 but that is part of a different HVAC system. In such an embodiment, the configuration of the HVAC system controller 105 can be used to configure the HVAC system controller 155. Aspects of the HVAC system controller 155 can be the same as or similar to aspects of the HVAC system controller 105.

Figure 2:
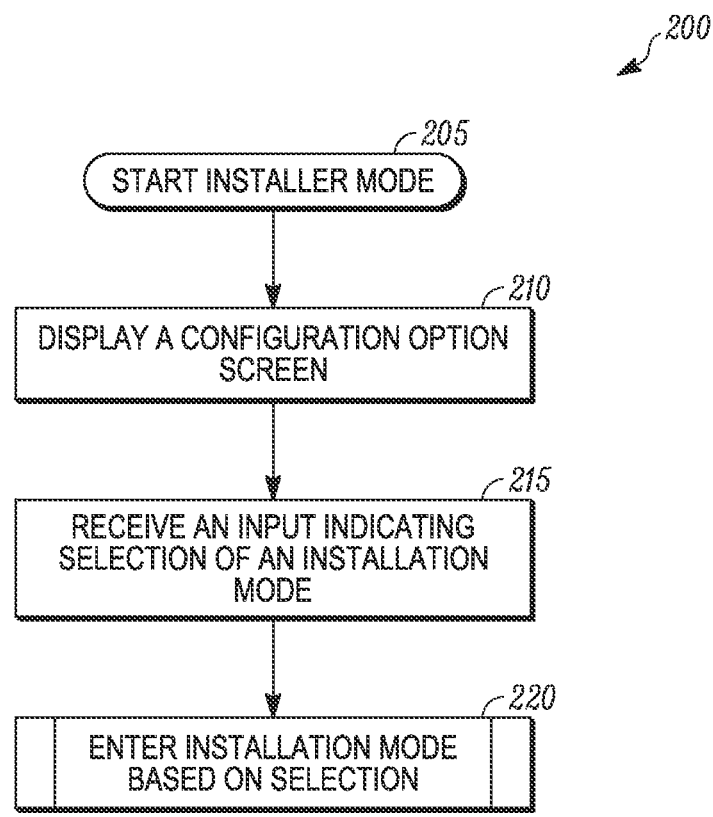
FIG. 2 illustrates a flowchart of a method to enter an installation mode in an HVAC system controller, according to an embodiment.

FIG. 2 illustrates a flowchart of a method 200 to enter an installation mode in an HVAC system controller (e.g., the HVAC system controller 105 of FIG. 1). The method 200 generally includes displaying a plurality of configuration options on the user interface 125 and entering an installation mode based on an input received from the user interface 125.

The method 200 begins at 205 when an Installer Mode is started. Alternatively, the Installer Mode can also be referred to as the Configuration Mode. In an embodiment, the Installer Mode can be entered upon initially powering on the HVAC system controller 105. In another embodiment, the Installer Mode can be entered when the HVAC system controller 105 receives an input indicating that the Installer Mode has been selected. For example, in an embodiment, the Installer Mode may be entered from a Settings Menu of the HVAC system controller 105. In an embodiment, the HVAC system controller 105 can include one or more parameters configured to a default setting. The one or more parameters configured to a default setting may be overridden. At 210, the HVAC system controller 105 displays a Configuration Options Screen on the user interface 125. The Configuration Options Screen is discussed in additional detail in accordance with FIG. 6 below.

At 215, the HVAC system controller 105 receives an input indicating a selection of a particular installation mode on the Configuration Options Screen and enters the particular installation mode based on the input received at 220. The particular installation mode can include a Selectable Profile Mode (discussed in accordance with FIG. 3 below), a Save Configuration Mode (discussed in accordance with FIG. 4 below), or a Web Installation Mode (discussed in accordance with FIG. 5 below). The particular installation mode can also include a Standard Installation Mode and an Advanced Installation Mode. The Standard and Advanced Installation Modes are similar to the known methods in which the one or more parameters are individually configured. For example, a Standard Installation Mode can include a process including configuring basic parameters (such as, but not limited to, an outdoor unit type, an outdoor unit number of stages, an indoor heat number of stages, an indoor blower type, and the like) in order for the HVAC system controller 105 to function. An Advanced Installation Mode can include configuring additional parameters, such as, but not limited to, a number of compressor cooling cycles per hour, a filter type, and the like.

Figure 3:
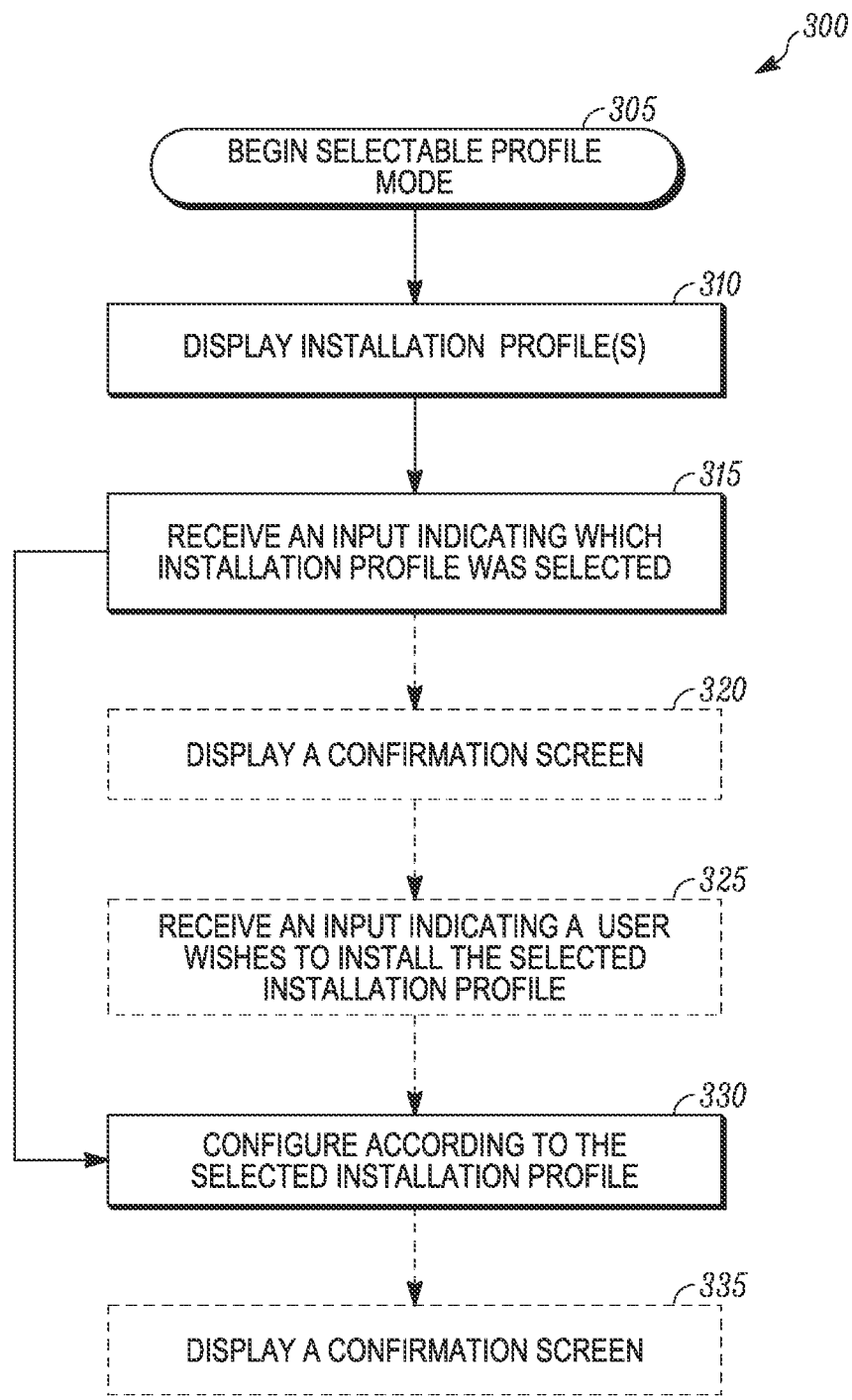
FIG. 3 illustrates a flowchart of a method to configure an HVAC system controller in a Selectable Profile Mode, according to an embodiment.

FIG. 3 illustrates a flowchart of a method 300 to configure an HVAC system controller (e.g., the HVAC system controller 105 of FIG. 1) in the Selectable Profile Mode. In an embodiment, the Selectable Profile Mode can also be referred to as a One Touch Installation Mode. The method 300 generally includes providing a user with at least one installation profile for configuring the HVAC system controller 105. The installation profile contains a setting for at least one of the plurality of parameters, according to an embodiment. In another embodiment, the installation profile contains a setting for each of the plurality of parameters such that a user can select an installation profile to configure the HVAC system controller 105 instead of individually configuring each parameter. The at least one installation profile can be stored in the memory 115. In an embodiment, the at least one installation profile can be modified or additional installation profiles added by an update received, for example, over the network 145. In another embodiment, an update to the at least one installation profile can be loaded into the memory 115 via a portable storage device (e.g., a Flash memory device) that can be connected to the HVAC system controller 105. In an embodiment, the HVAC system controller 105 can include one or more parameters configured to a default setting. The one or more parameters configured to a default setting may be overridden.

The method 300 begins at 305 with the start of the Selectable Profile Mode. The Selectable Profile Mode can be entered based on an input received from the user interface 125 in the method 200. Accordingly, 305 follows from 220 when a Selectable Profile Mode is selected in the method 200.

At 310, the HVAC system controller 105 displays at least one installation profile on the user interface 125. In an embodiment, the HVAC system controller 105 displays the Installation Profile Screen which is discussed in further detail in accordance with FIG. 7 below. The one or more installation profiles include one or more settings that can be used to configure the HVAC system controller 105. In an embodiment, the at least one installation profile can be, for example, based on a typical HVAC equipment configuration.

The HVAC system controller 105 receives an input indicating an installation profile selection at 315. In an embodiment, the HVAC system controller 105 can then configure the parameters based on the plurality of settings in the installation profile at 330.

In another embodiment, the HVAC system controller 105 can display a Confirmation Screen at 320. The Confirmation Screen can, for example, include a message requiring a confirmation in order to install the selected installation profile. In another embodiment, the Confirmation Screen can include a list of all parameters and corresponding settings for the parameters based on the selected installation profile. A Confirmation Screen according to an embodiment is discussed in further detail in accordance with FIG. 8 below. At 325, the HVAC system controller 105 receives an input indicating an installation selection on the Confirmation Screen. The plurality of parameters is set according to the settings provided in the installation profile at 330.

In an embodiment, the HVAC system controller 105 may display an installation successful confirmation message at 335.

Figure 4:
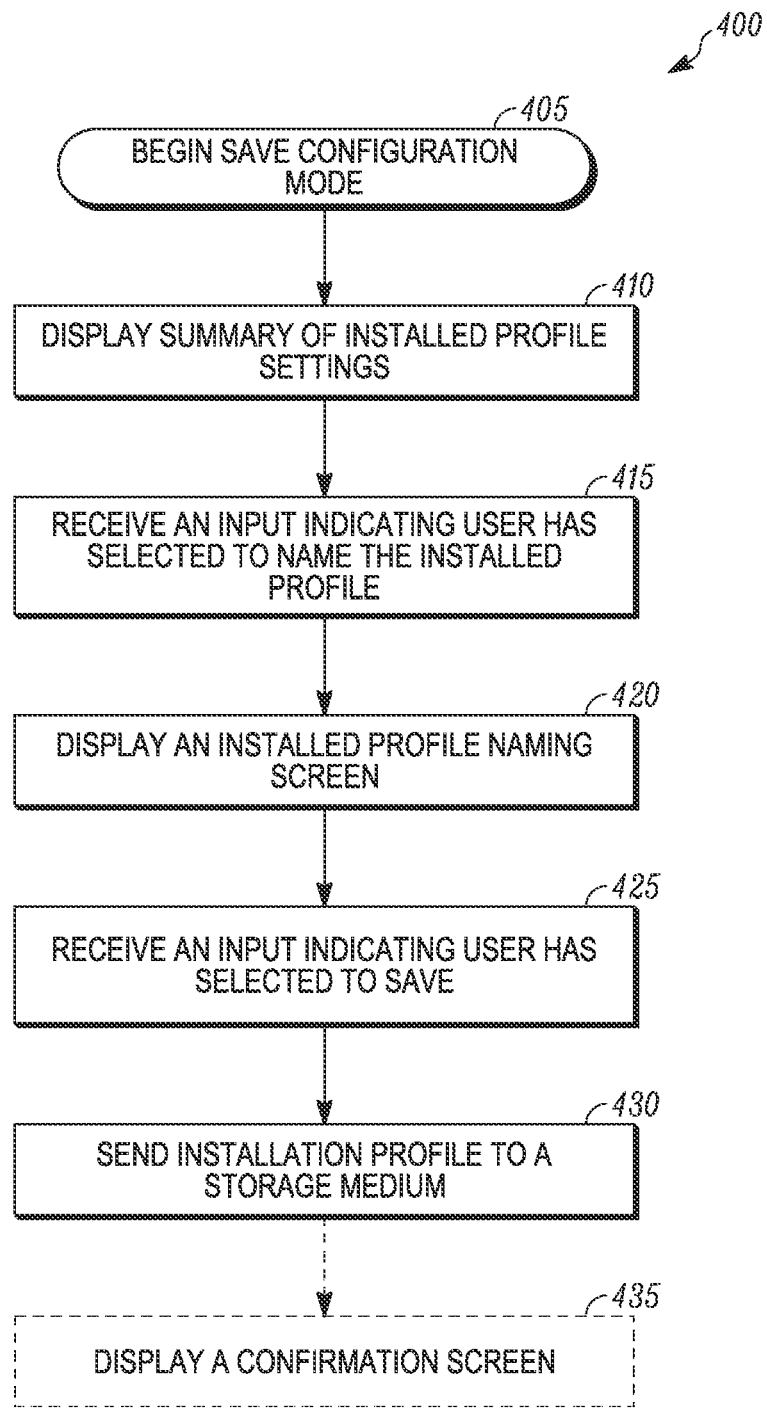
FIG. 4 illustrates a flowchart of a method to save an installed configuration of an HVAC system controller in a Save Configuration Mode, according to an embodiment.

FIG. 4 illustrates a flowchart of a method 400 to save a configuration of an HVAC system controller (e.g., the HVAC system controller 105 of FIG. 1) according to the Save Configuration Mode. The method 400 generally includes saving an installed profile following configuration of the HVAC system controller 105. The HVAC system controller 105 can be configured using any method (Standard, Advanced, Selectable Profile Mode, or Web Installation Mode) prior to saving the installed configuration using the method 400. In an embodiment, the method 400 can be entered any time following configuration of the HVAC system controller 105. In an embodiment, an error message can be displayed if the method 400 is entered prior to configuring one or more parameters of the HVAC system controller 105.

The method 400 begins at 405 with the start of the Save Configuration Mode. The Save Configuration Mode can be entered based on an input received from the user interface 125 in the method 200. Accordingly, 405 follows from 220 when the Save Configuration Mode is selected in the method 200.

At 410, the HVAC system controller 105 displays a summary of the installed profile settings on the user interface 125. As previously described, the installed profile settings can be installed using any method. In an embodiment, the summary of the installed profile settings can include a scrolling option in order to review all of the configured settings. An Installed Profile Summary Screen is described in further detail in accordance with FIG. 9 below, according to an embodiment.

At 415, the HVAC system controller 105 receives an input indicating a selection of an option to name the installed profile. In an embodiment, the option can be a "continue" option. At 420, the HVAC system controller 105 displays an input screen on the user interface 125 such that a user can name the installed profile. In an embodiment, the screen can display a default name for the installed profile. In another embodiment, the screen may not include a default name. An Input Screen according to an embodiment is described in further detail in accordance with FIG. 10 below.

At 425, the HVAC system controller 105 receives an input indicating a selection to save the installed profile. The input can include the name of the profile as well. At 430, the HVAC system controller 105 sends the installed profile to the storage 150 via the network 145. The HVAC system controller 105 may be configured separately with a username and password to access the storage 150, according to an embodiment. In another embodiment, the HVAC system controller may include a device identifier that can be sent along with the installed profile in order to authenticate with the storage 150.

Optionally, at 435 the HVAC system controller 105 may display a confirmation screen on the user interface 125. In another embodiment, the method 400 may not include displaying a confirmation screen. A Confirmation Screen, according to an embodiment, is described in further detail in accordance with FIG. 11 below.

Figure 5:
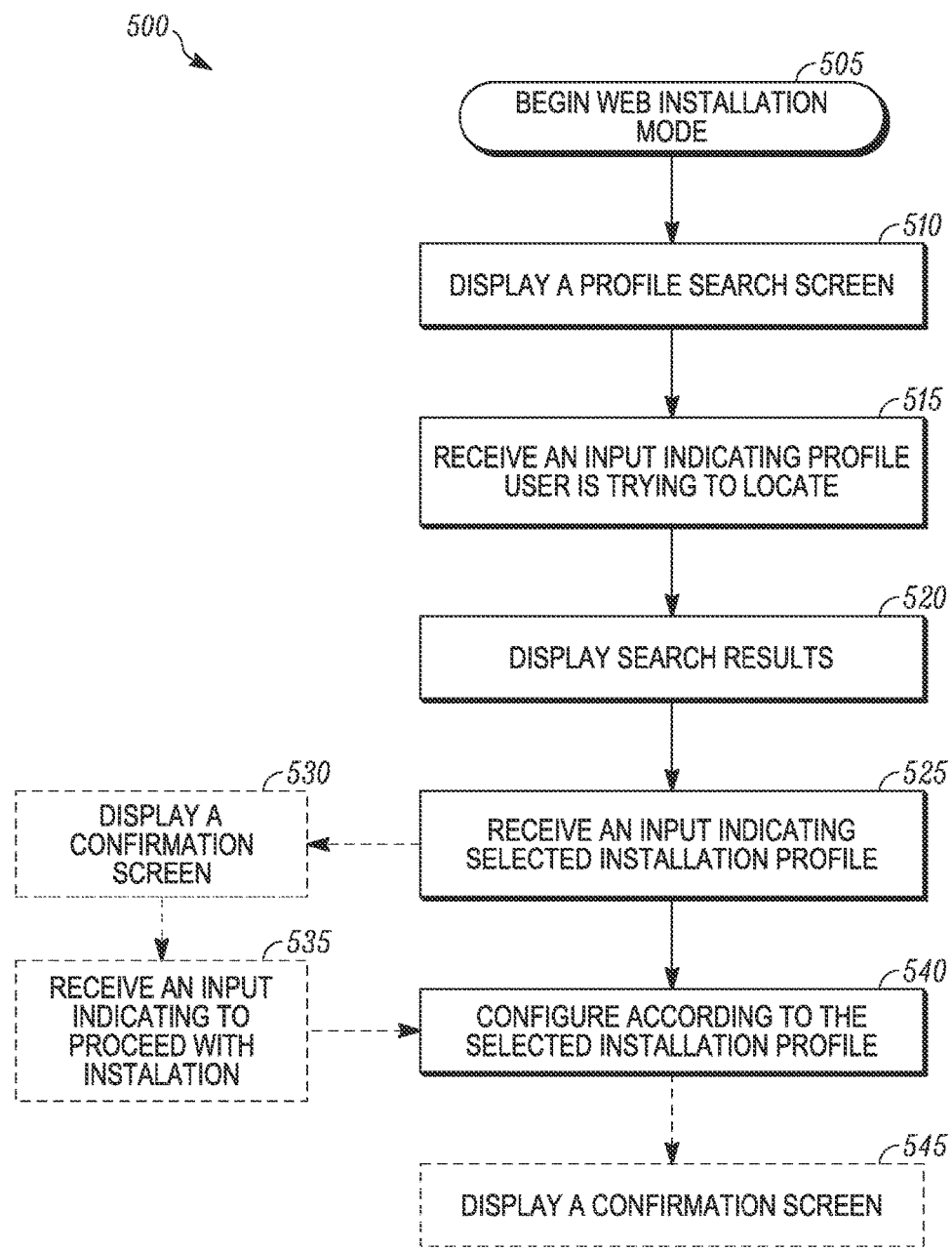
FIG. 5 illustrates a flowchart of a method to configure an HVAC system controller in a Web Installation Mode, according to an embodiment.

FIG. 5 illustrates a flowchart of a method 500 to configure an HVAC system controller (e.g., the HVAC system controller 105 of FIG. 1) in the Web Installation Mode. In an embodiment, the Web Installation Mode can also be referred to as a Network Installation Mode or a Saved Configuration Installation Mode. The method 500 generally includes retrieving a saved profile that has been saved to the storage 150 using the method 400 (Save Configuration Mode) as described above.

The method 500 begins at 505 with the start of the Web Installation Mode. The Web Installation Mode can be entered based on an input received from the user interface 125 in the method 200. Accordingly, 505 follows from 220 when the Web Installation Mode is selected in the method 200.

At 510, the HVAC system controller 105 displays a search screen. The search screen can receive a keyword or phrase. The installed profile search screen can, for example, include a keyboard or similar means by which a user can input a name of an installed profile which the user is attempting to install. In an embodiment including a display device and one or more buttons, the display device can display the search term and the buttons can be used to input the search term.

At 515, the HVAC system controller 105 receives an input indicating a name of an installed profile to be located. The HVAC system controller 105 queries the storage 150 and displays a list of search results on the user interface 125 at 520. In an embodiment, the search results include a list of a portion of the results containing the search term. In another embodiment, the search results include a list of all results containing a search term. In an embodiment, the number of results displayed can be a default value, such as but not limited to, about 10. In another embodiment, the HVAC system controller 105 can receive an input indicating a name of an installed profile to be located and one or more parameters and the corresponding setting to be located at 515. In yet another embodiment, the HVAC system controller can receive an input indicating either a name of an installed profile or one or more parameters and the corresponding setting.

At 525, the HVAC system controller 105 receives an input indicating a particular installed profile has been selected from the search results. In response to the input at 525, the HVAC system controller 105 configures the one or more parameters based on the corresponding one or more settings in the installation profile, according to an embodiment.

In another embodiment, the HVAC system controller 105 displays a Confirmation Screen at 530. The Confirmation Screen can, for example, include a message requiring a user to confirm in order to install the selected installation profile. In another embodiment, the Confirmation Screen can include a list of parameters and the corresponding settings for the selected installation profile. The Confirmation Screen can also include a "Back" or "Cancel" button so a user can browse the various installation profiles prior to installation. At 535, the HVAC system controller 105 receives an input indicating a selection to install the selected installation profile. The HVAC system controller 105 sets the plurality of parameters according to the settings provided in the installation profile at 540.

In an embodiment, the HVAC system controller 105 may display an installation successful confirmation message at 545. In an embodiment, if an error occurs (such as, but not limited to, the network 145 connection is disrupted during receipt of the installation profile) during configuration, the HVAC system controller 105 can display an installation error message at 545. In such an embodiment, if any of the one or more parameters has been set, the HVAC system controller 105 can revert to the previous configuration (which can include having no settings configured for the one or more parameters).

FIGS. 6-11 are illustrations of a user interface (e.g., the user interface 125 of FIG. 1) for an HVAC system controller (e.g., the HVAC system controller 105 of FIG. 1), according to an embodiment. The illustrations include text and buttons according to an embodiment. It is to be understood that the screens can be modified without departing from the scope of this disclosure. For example, a "Back" button (e.g., "Back" button 630) can include a symbol such as, but not limited to, an arrow, an image, or alternative text.

Figure 6:
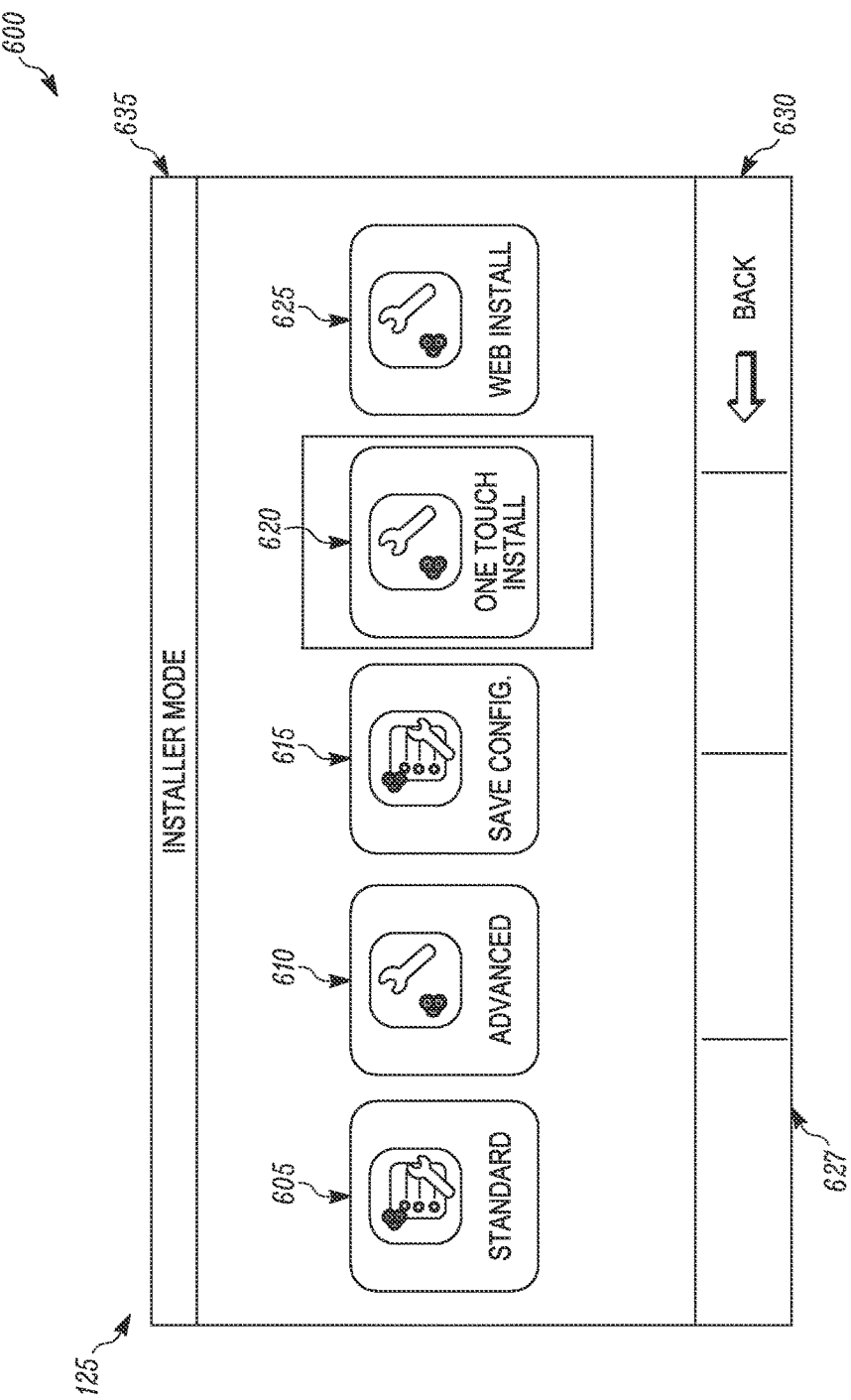
FIGS. 6-11 illustrate a user interface for an HVAC system controller, according to an embodiment.

FIG. 6 illustrates the user interface 125 when configured to display the Configuration Options Screen 600, according to an embodiment. The user interface 125 includes a plurality of installation method icons 605-625, a navigation bar 627 including, for example, a "Back" button 630, and a title bar 635. The installation method icons 605-625 include the various configuration selections. The installation method icon 605 is an icon representing a Standard Installation Mode, installation method icon 610 is an icon representing an Advanced Installation Mode, installation method icon 615 is an icon representing a Save Configuration Mode, installation method icon 620 is an icon representing a One Touch Installation Mode (generally referred to as a Selectable Profile Mode), and installation method icon 625 is an icon representing a Web Installation Mode. An icon, for example, includes a graphic image that is used by the HVAC system controller 105 to display information and/or allow a user to interact with the user interface 125.

In another embodiment, the Configuration Options Screen 600 can include fewer or additional features. For example, the navigation bar 627 can include a "Home" button that is configured to return a user to a home screen.

The installation method icons 605-625 are configured such that in response to receiving an input indicating one of the installation method icons 605-625 has been selected, the HVAC system controller 105 takes an action. For example, the method 300 may begin when the installation method icon 620 is selected, the method 400 may begin when the installation method icon 615 is selected, and the method 500 may begin when the installation method icon 625 is selected.

Figure 7:
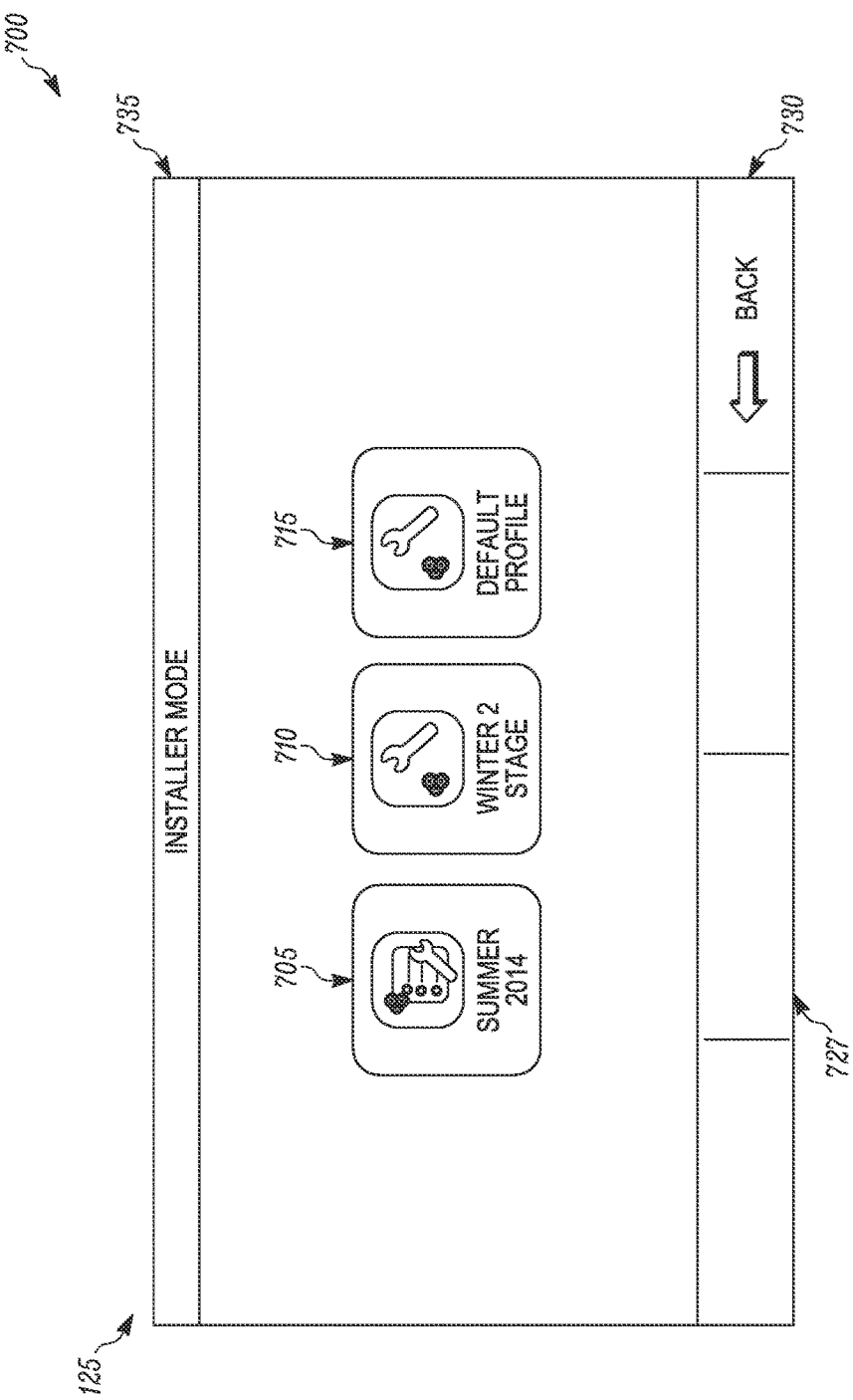

FIG. 7 illustrates the user interface 125 when configured to display the Installation Profile Screen 700, according to an embodiment. The Installation Profile Screen 700 includes a plurality of installation profile icons 705-715, a navigation bar 727 including, for example, a "Back" button 730, and a title bar 735. The Installation Profile Screen 700 in the illustrated embodiment includes three installation profiles 705-715. In another embodiment, the Installation Profile Screen 700 can include fewer or additional installation profiles. In an embodiment, the Installation Profile Screen 700 can include a scroll feature in order to display additional options.

Figure 8:
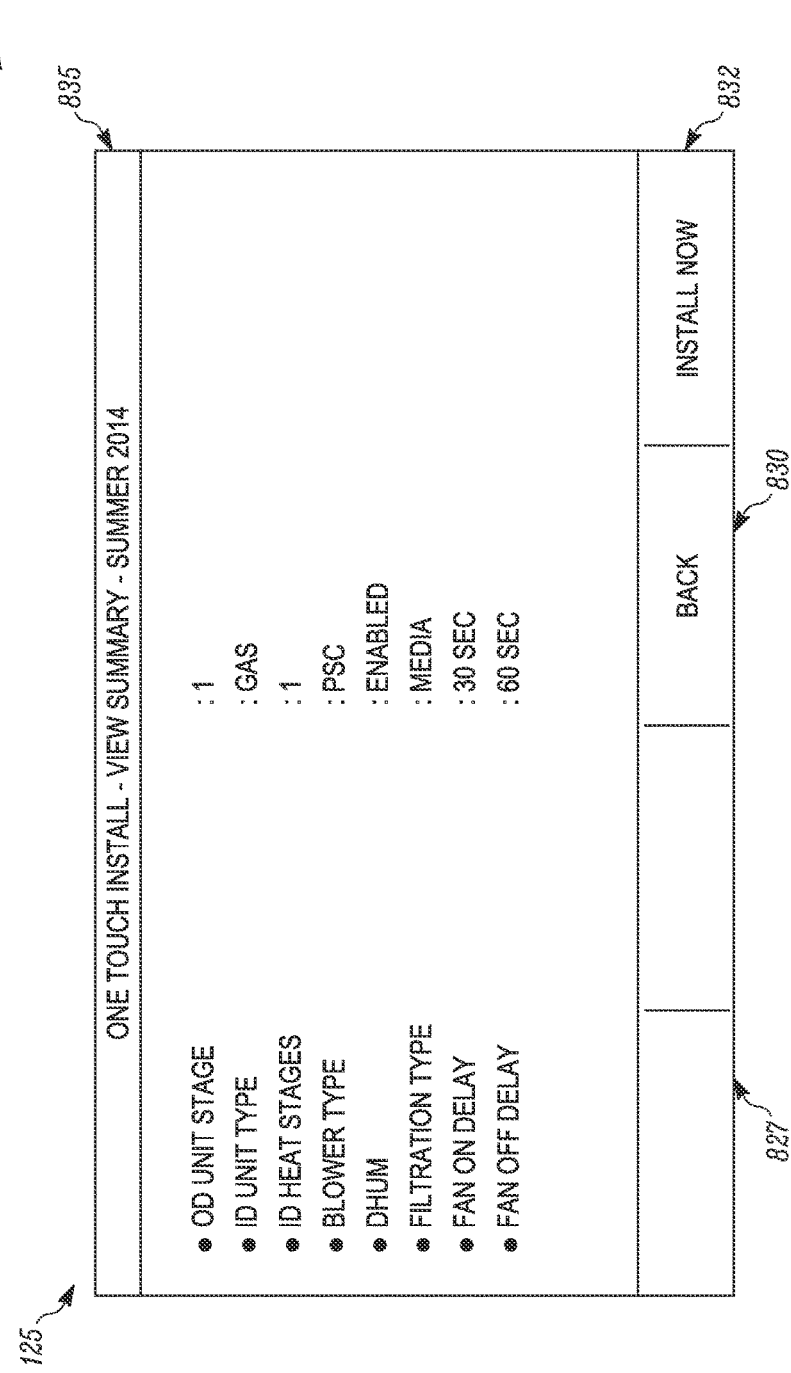

FIG. 8 illustrates the user interface 125 when configured to display a Confirmation Screen 800, according to an embodiment. The Confirmation Screen 800 includes a summary of parameters and corresponding settings for a particular installation profile. The Confirmation Screen 800 also includes a navigation bar 827 including, for example, a "Back" button 830 and an "Install Now" button 832, and a title bar 835. It is to be understood that the particular text on the "Install Now" button 832 is exemplary and can be modified. For example, the "Install Now" button 832 can have a different shape or can display as "Install." In an embodiment, the Confirmation Screen 800 can include a scroll feature in order to display all parameters and the corresponding settings.

Figure 9:
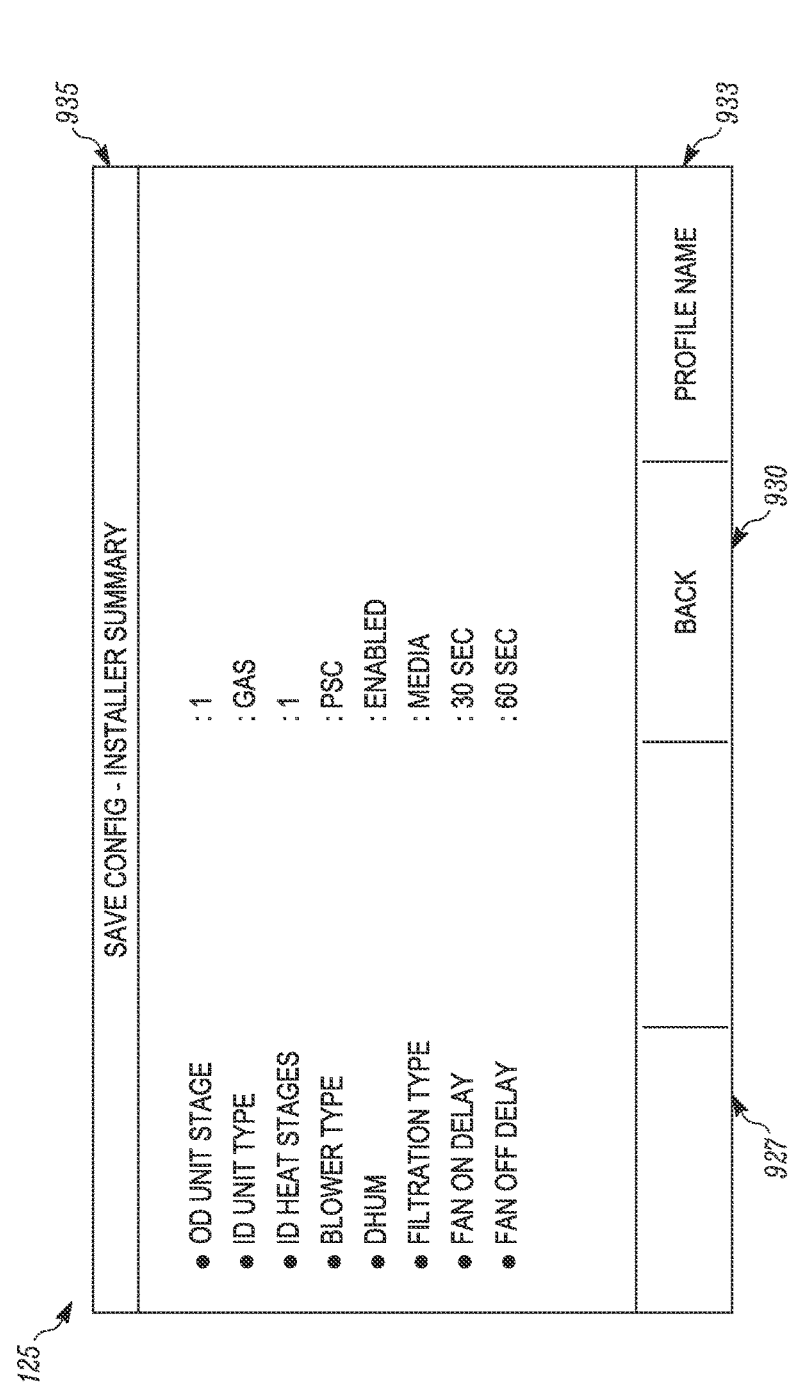

FIG. 9 illustrates the user interface 125 when configured to display an Installed Profile Summary Screen 900, according to an embodiment. The Installed Profile Summary Screen 900 can be the same as or similar to the Confirmation Screen 800, according to an embodiment. The Installed Profile Summary Screen 900 includes a summary of parameters and the corresponding settings (that have already been configured), a navigation bar 927 including, for example, a "Back" button 930 and a "Profile Name" button 933, and a title bar 935. It is to be understood that the particular text on the "Profile Name" button 933 is exemplary and can be modified. For example, the "Profile Name" button 933 can have a different shape or can display as "Save Profile." In an embodiment, the Confirmation Screen can include a scroll feature in order to display all parameters and corresponding settings.

Figure 10:
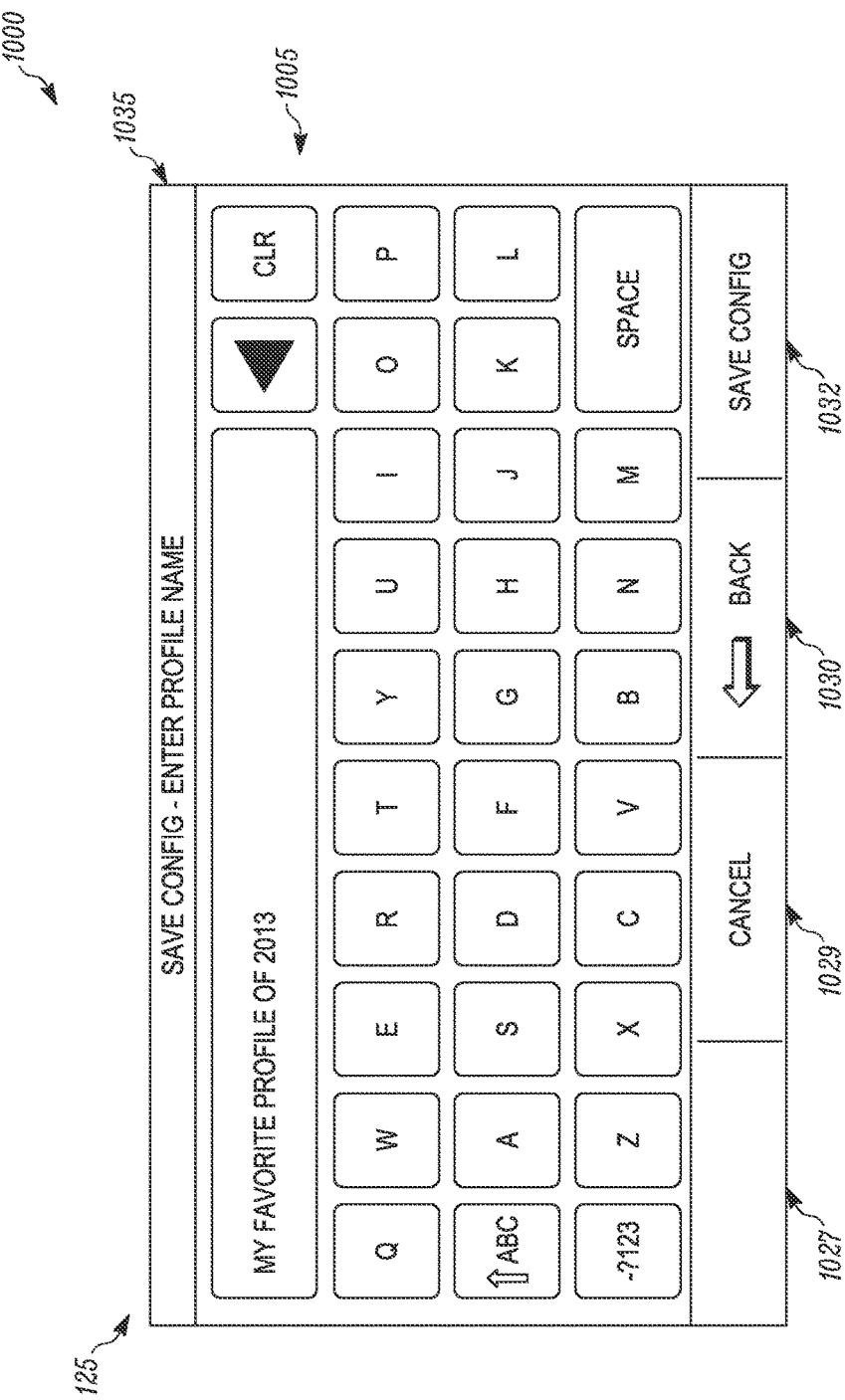

FIG. 10 illustrates the user interface 125 when configured to display a Profile Naming Screen 1000, according to an embodiment. The Profile Naming Screen 1000 can include, for example, a keyboard 1005, a navigation bar 1027 including, for example, a "Cancel" button 1029, a "Back" button 1030, and a "Save Config" button 1032, and a title bar 1035. It is to be understood that the particular text on the "Save Config" button 1032 is exemplary and can be modified. For example, the "Save Config" button 1032 can have a different shape or can display as "Save." The Profile Naming Screen 1000 can be modified such that it can be used for different functionalities. For example, the Profile Naming Screen 1000 can be used to enter a profile name in the Save Configuration Mode (e.g., method 400) or can be used to receive an input in the searching operations of the Web Installation Mode (e.g., method 500). The title bar 1035 and functionality of the buttons in the navigation bar 1027 can change accordingly.

Figure 11:
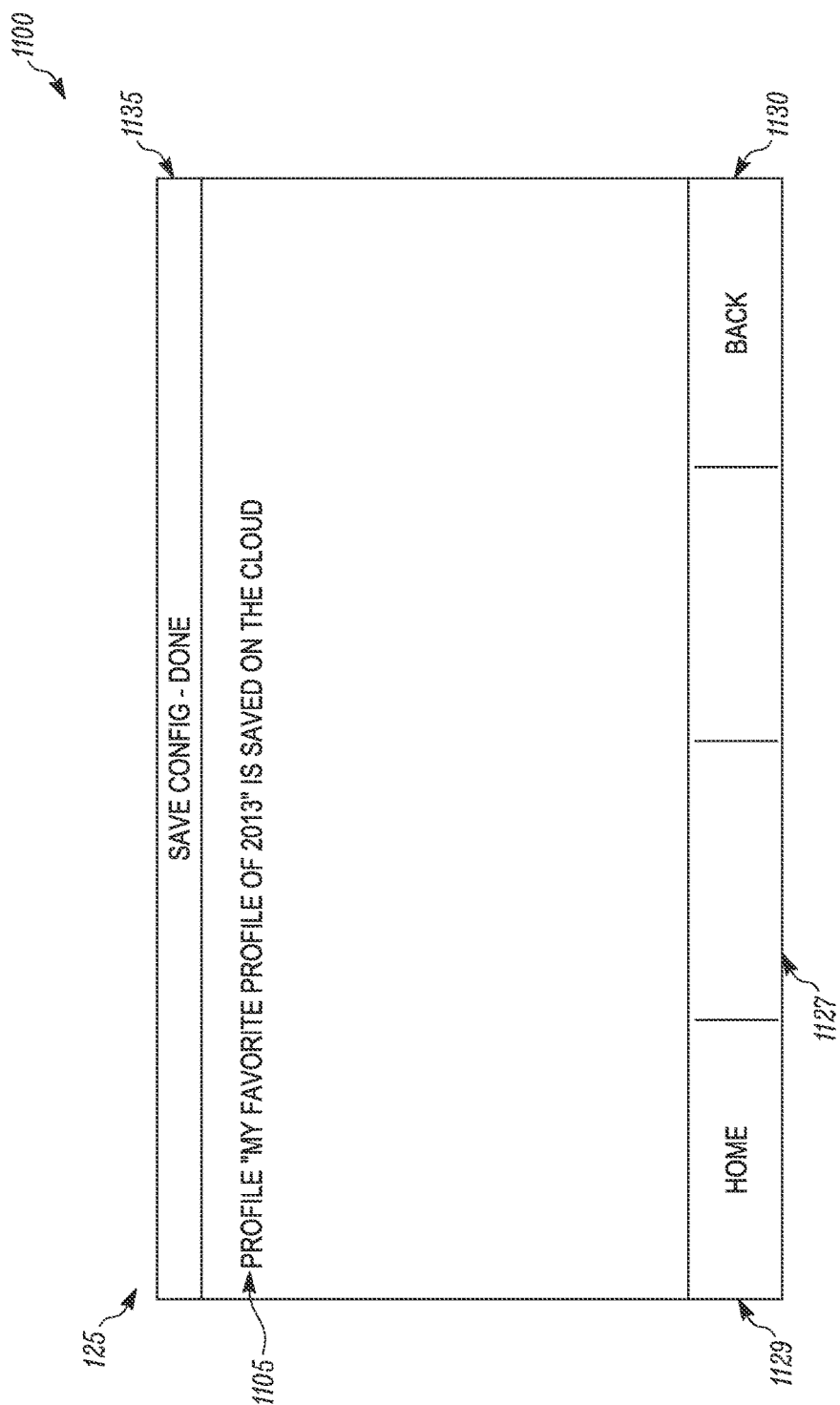

FIG. 11 illustrates the user interface 125 when configured to display a Save Confirmation Screen 1100, according to an embodiment. The Save Confirmation Screen 1100 can include, for example, a message 1105, a navigation bar 1127 including, for example, a "Home" button 1129 and a "Back" button 1130, and a title bar 1135. The Save Confirmation Screen 1100 can be configured for different functionalities and can represent a confirmation screen in the above-described embodiments. For example, the Save Confirmation Screen 1100 can be displayed as a confirmation screen in any of the previously described installation modes. The title bar 1135 and functionality of the buttons in the navigation bar 1127 can be modified according to the selected functionality.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specific the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

What is claimed is:

1. A method for configuring a heating, ventilation, and air conditioning (HVAC) system controller, the method comprising:
    displaying an installation profile icon on a user interface of the HVAC system controller, the installation profile icon representing an installation profile, wherein the installation profile includes a plurality of parameters defining equipment the HVAC system controller is configured to control, each of the plurality of parameters having a preselected equipment configuration setting in the installation profile, the plurality of parameters including two or more of an outdoor unit type, a number of cooling stages, a compressor type, an indoor unit type, a number of heating stages, and an indoor blower type;
    receiving a first input on the user interface of the HVAC system controller based on a selection of the installation profile icon; and
    setting all of the plurality of parameters in the memory of the HVAC system controller using the preselected equipment configuration settings in the installation profile in response to receiving the first input.

2. The method according to claim 1, further comprising: displaying a confirmation screen when the configuration is complete.

3. The method according to claim 1, further comprising: resetting at least one of the plurality of equipment configuration settings.

4. The method according to claim 1, further comprising: sending the installation profile from the HVAC system controller to a storage medium in communication with the HVAC system controller over a network.

5. The method according to claim 4, further comprising: displaying a confirmation screen when the installation profile has been sent to the storage medium.

6. The method according to claim 4, further comprising: receiving the installation profile from the storage medium in response to a second input on a second user interface of a second HVAC system controller, the second input indicating a request to configure the second HVAC system controller based on the installation profile of the HVAC system controller.

7. The method according to claim 4, wherein sending the installation profile includes authenticating the HVAC system controller based on a device identifier.

8. A heating, ventilation, and air conditioning (HVAC) system controller, comprising:
    a processor in communication with a memory and a user interface, wherein the processor:
        displays an installation profile icon on the user interface of the HVAC system controller, the installation profile icon representing an installation profile,
        wherein the installation profile includes a plurality of parameters defining equipment the HVAC system controller is configured to control, each of the plurality of parameters having a preselected equipment configuration setting in the installation profile, the plurality of parameters including two or more of an outdoor unit type, a number of cooling stages, a compressor type, an indoor unit type, a number of heating stages, and an indoor blower type;
        receives a first input on the user interface of the HVAC system controller based on a selection of the installation profile icon; and
        sets all of the plurality of parameters in the memory of the HVAC system controller using the preselected equipment configuration settings in the installation profile in response to receiving the first input.

9. The HVAC system controller according to claim 8, wherein the processor is in communication with a network interface.

10. The HVAC system controller according to claim 9, wherein the processor:
    receives a second input on the user interface of the HVAC system controller, the second input including a name for an installed profile, the installed profile including a plurality of equipment configuration settings for a plurality of parameters; and
    sends the installed profile from the HVAC system controller to a storage medium in communication with the HVAC system controller over a network.

11. The HVAC system controller according to claim 9, wherein the processor:
   receives a second input on the user interface of the HVAC system controller, the second input indicating a keyword of a previously installed profile stored on a storage medium, wherein the HVAC system controller is in communication with the storage medium over a network;
   displays a search result list based on searching the storage medium by the keyword;
   displays the search result list;
   receives a third input on the user interface of the HVAC system controller, the third input indicating a selection of the previously installed profile from the search result list; and
   sets one or more parameters in the memory of the HVAC system controller based on one or more equipment configuration settings for the one or more parameters in the previously installed profile in response to receiving the third input.

12. The HVAC system controller according to claim 8, wherein the user interface is a touchscreen.

13. The HVAC system controller according to claim 8, wherein the preselected equipment configuration settings are set to make the HVAC system controller operate an HVAC system.

14. The HVAC system controller according to claim 8, wherein by receiving the first input on the user interface of the HVAC system controller based on the selection of the installation profile icon, a configuration of the HVAC system controller is completed and skips a process by which each equipment configuration setting is selected in a screen-by-screen configuration process.

* * * * *